Patented Sept. 7, 1948

2,449,039

UNITED STATES PATENT OFFICE 2,449,039

THERAPEUTIC COMPOSITION

Raymond L. Libby, Poundridge, N. Y., assignor to American Cyanamid Company, New York, N. Y., a corporation of Maine No Drawing. Application September 22, 1945, Serial No. 618,054

7 Claims. (Cl. 167—65)

This invention relates to a new composition of matter comprising penicillin, to a method of preparing the same, and to a method of using the new composition whereby therapeutically effective levels of penicillin are introduced into the blood stream.

In my co-pending application, Serial No. 589,249, filed April 19, 1945, of which this is a continuation-in-part, I disclosed a new composition of matter comprising a stable, therapeutically active derivative of penicillin in intimate association with a water-insoluble, assimilable oil or fat. As disclosed therein, this composition, particularly when containing certain proportions of the penicillin derivative and glyceride, was effective in establishing therapeutic levels of penicillin in the blood stream when administered orally to either man or animal.

Although the composition described may be taken in bulk, that is, as a liquid taken from a bottle in measured volumes, the ordinary, most convenient, and safest method of administering it is in a gelatin capsule containing predetermined amounts of the penicillin derivative.

It was discovered shortly after suitable penicillin-oil mixtures were placed on the market in gelatin capsules that the capsules became coated with a layer of oil. As a result the capsules presented an undesirable and unattractive appearance and were unpleasant and unsanitary to handle. Study of the cause of this unexpected difficulty led to the discovery that the small particles of penicillin derivative, even though coated with oil, were hygroscopic and extracted water from the gelatin capsule. As is well known, gelatin capsules, particularly those of the soft shell type, contain appreciable amounts of water. When the water was extracted by the penicillin derivative from the capsule shell, tiny holes were developed, whereupon the oil leaked through, causing the trouble previously mentioned. True enough, the holes were not large and the leakage, from a quantitative point of view, was not serious, but, nevertheless, the trouble required correction before the encapsulated penicillin-oil mixture could be made an acceptable item of commerce.

It was found unexpectedly that if the penicillin derivative was first mixed with shellac, or an analogous enteric coating material such as an alkyd resin, and the individual discrete particles of the penicillin derivative were coated and then incorporated in the oil, the product could be placed in gelatin capsules and the trouble caused by the leaking capsules was eliminated.

To prepare the new composition, confectioner's glaze, which consists of arsenic-and rosin-free shellac dissolved in ethyl alcohol and/or ethyl acetate, acetone, or other solvent, is cut to approximately four pounds of shellac per gallon, although, as will be appreciated, the percentage of the shellac in the solution is not critical. The desired quantity of a selected penicillin salt, in finely divided form, is then mixed with the shellac solution and the product is, preferably, dried under vacuum at a low temperature. The composition is then ground to a powder, mixed with one of the glycerides mentioned in my aforesaid application, and the product is then ready to be placed in capsules.

The proportions of shellac to penicillin derivatives must fall within certain limits if the product is to be of therapeutic value and possess the advantage of being stable in gelatin capsules. When the product contains more than about ½ part by weight, dry basis, of shellac for each part by weight of penicillin derivative, the shellac coating may be so thick that it resists the action of the fluids in the stomach and upper intestinal tract, is not dissolved and the penicillin is not released in a part of the body from which it can be absorbed into the blood stream. I prefer, therefore, that my product does not contain more than about ½ part by weight of shellac for each part of penicillin derivative.

As the proportion of shellac is diminished the therapeutic effectiveness of the product increases until the optimum value of about ⅛ of one part by weight of shellac to one part by weight of penicillin derivative is reached. As the proportion of shellac is further diminished the danger of damage to the gelatin capsule by the hygroscopic action of the penicillin is increased. Although, as will appear from my earlier filed application, the product is highly effective without any shellac being present, it is desirable to use about 1/20 of one part by weight of shellac for each part by weight of penicillin derivative if the advantages of the present invention are to be attained.

In my earlier filed application it was pointed out that most effective results were attained when the composition contained from about 0.1 to 0.6 cc. of oil for each 40,000 Oxford units of the penicillin derivative. Obviously, as the shellac, or equivalent material which may be used, has an enteric action and delays the release of the penicillin, it will be found that the ratios described in my earlier application do not necessarily prevail in the composition of the present invention. Actually, it is possible to use a much wider range of oil to penicillin derivative.

Inasmuch as the ordinary gelatin capsules will contain about 25,000 Oxford units of the penicillin, the amount of oil will be from about 0.1 to 1.0 cc. of oil for each 25,000 Oxford units, the proportions of shellac being as previously indicated.

The penicillin derivative employed may be any one of a number of known stable, therapeutically active derivatives of penicillin such as a salt or ester of penicillin acids. Salts, such as the alkali metal or alkaline earth metal, sodium, potassium, lithium, calcium, magnesium metals, are preferred although other salts such as the ammonium and aluminum or amine salts may be used. Likewise, the esters such as the acetyl ester, glyceryl ester, or other known penicillin ester, may be employed if desired. Inasmuch as the product is to be administered orally it is possible to use less highly refined penicillin derivatives. This is, obviously, one of the advantages of the invention in that such penicillin products are less costly.

The water insoluble, assimilable oil or fat may be any one or more of the common ainmal, fish, or vegetable oils or fats, such as, for example, cottonseed oil, cocoanut oil, corn oil, peanut oil, olive oil, soy bean oil, shark liver oil, sperm oil, lard, butter, or other digestable glycerides. Hydrogenated oils, mixed glycerides and monoglycerides, etc., may also be used.

As will be apparent to those skilled in the art, the gelatin capsule may be of either the hard shell or soft shell type, as desired. Because of the protective action of the enteric coating on the penicillin prticles certain plasticizers and other modifying agents may be incorporated in the gelatin shell or in the contents of the capsule, which substances could not otherwise be employed. Also, the contents may contain excipients, flavoring agents, binders, perservatives, thickeners, such as ethyl cellulose, gum acacia, hydrogenated oils, etc.; emulsifying agents, such as glyceryl, mono-stearate, coloring matter, etc., may be mixed therewith, if desired.

I claim:

1. A new composition of matter comprising discrete particles of a stable, therapeutically active derivative of penicillin covered with shellac and suspended in a water-insoluble, assimilable glyceride.

2. A new article of manufacture comprising discrete particles of a salt of penicillin coated with shellac and admixed with a water-insoluble, assimilable glyceride, said mixture being enclosed in a gelatin capsule.

3. A new composition of matter comprising discrete particles of a salt of penicillin coated with shellac in proportions within the range from about $1/20$ to $1/2$ part by weight of shellac for each part by weight of penicillin salt, the shellac-coated particles being in intimate association with a water-insoluble, assimilable glyceride, the composition being enclosed in a gelatin capsule.

4. A therapeutically effective composition of matter comprising a gelatin capsule containing an anhydrous mixture of a water-insoluble, assimilable glyceride and discrete particles of a therapeutically active, stable salt of penicillin coated with from about $1/20$ to $1/2$ part by weight of shellac.

5. A method of preparing a therapeutically effective composition of matter which comprises mixing together a stable, therapeutically active penicillin salt and a solution of shellac, drying the mixture, subdividing the dried product, mixing the product with a glyceride oil and enclosing the mixture in a gelatin capsule.

6. A new article of manufacture comprising discrete particles of a stable, therapeutically active derivative of penicillin covered with a substantially water impermeable enteric coating, and a water insoluble assimilable glyceride, in which said enteric coated particles are suspended, the whole mixture being enclosed in a gelatin capsule.

7. A method of preparing a therapeutically effective composition of matter which comprises mixing together discrete particles of a stable, therapeutically active derivative of penicillin and a solution of a substantially water impermeable enteric coated material, drying the mixture to remove the solvent, subdividing the dried product to obtain discrete particles comprising said penicillin derivative substantially completely coated with a water impermeable enteric coated composition, and mixing these enteric coated particles with a water insoluble assimilable glyceride.

RAYMOND L. LIBBY.

REFERENCES CITED

The following references are of record in the file of this patent:

FOREIGN PATENTS

| Number | Country | Date |
|---|---|---|
| 285,091 | Great Britain | June 10, 1929 |

OTHER REFERENCES

Science, Feb. 16, 1945, pages 178 to 180.
Science, Mar. 2, 1945, pages 228 and 229.